(12) United States Patent
Bell

(10) Patent No.: US 6,554,422 B2
(45) Date of Patent: Apr. 29, 2003

(54) NECK-SAVER EYEGLASS FRAMES FOR BI-FOCALS

(76) Inventor: John L. Bell, 2600 Timber Cove, Annapolis, MD (US) 21401

(*) Notice: Subject to any disclaimer, the term of this patent is extended or adjusted under 35 U.S.C. 154(b) by 0 days.

(21) Appl. No.: 10/010,664

(22) Filed: Dec. 6, 2001

(65) Prior Publication Data

US 2002/0067461 A1 Jun. 6, 2002

Related U.S. Application Data

(60) Provisional application No. 60/328,970, filed on Oct. 12, 2001, and provisional application No. 60/251,655, filed on Dec. 6, 2000.

(51) Int. Cl.$^7$ ................................................. G02C 5/04
(52) U.S. Cl. ........................................ 351/128; 351/55
(58) Field of Search ............................... 351/54, 55, 67, 351/70, 76, 124, 128, 137

(56) References Cited

U.S. PATENT DOCUMENTS

| | | | |
|---|---|---|---|
| 2,267,997 A | | 12/1941 | Spray |
| 2,446,725 A | * | 8/1948 | Seguin ........................ 351/128 |
| 2,607,271 A | | 8/1952 | Morse |
| 2,660,924 A | | 12/1953 | Stegeman |
| 2,801,569 A | | 8/1957 | Ralph |
| 2,986,971 A | | 6/1961 | Jent |
| 3,087,383 A | | 4/1963 | Ralph |
| 3,304,145 A | | 2/1967 | Hamm |
| 3,365,263 A | | 1/1968 | Allen |
| 3,476,468 A | | 11/1969 | Fortenberry |
| 3,712,717 A | | 1/1973 | Stoloff |
| 4,178,080 A | | 12/1979 | Elder |
| 4,280,758 A | | 7/1981 | Flader et al. |
| 4,331,393 A | | 5/1982 | Bradley, Jr. |
| 4,470,674 A | | 9/1984 | Piampiano |
| 4,506,961 A | | 3/1985 | Palmieri |
| 4,732,464 A | | 3/1988 | Bononi |
| 4,787,729 A | | 11/1988 | Ruffen |
| 5,159,359 A | * | 10/1992 | Pauly et al. ................. 351/128 |
| 5,499,063 A | * | 3/1996 | Butler et al. ................... 351/54 |
| 5,825,453 A | | 10/1998 | Baragar et al. |
| 6,045,223 A | | 4/2000 | Kawabata |

* cited by examiner

Primary Examiner—Huy Mai
(74) Attorney, Agent, or Firm—Law Offices of Royal W. Craig

(57) ABSTRACT

An adjustable nose-rest mechanism for bi-focals that allows ready one-hand and variable adjustment of the nose rest elevation relative to the lenses in order to vertically position the lenses (rather than tilting of the head) for ease of viewing computer screens and the like. The mechanism generally includes a boss attached or hooked onto the bi-focals, said boss comprising a hollow sleeve aligned vertically. An elongate slider is slidably carried in the boss, and a nose rest is attached at the lower end of the slider. A set screw is threaded frontally into the boss and is tightenable against the slider. The slider can be adjusted along a continuous range of elevations and locked into any of said positions by tightening the set screw, thereby facilitating adjustment of the nose rest. A mechanism for temporarily attaching a singularly adjustable nose-rest to any standard bi-focals, comprising an internally threaded tube, adjusting yoke, and spring support member.

19 Claims, 11 Drawing Sheets

NECK-SAVER EYEGLASS FRAMES FOR BI-FOCALS

CROSS-REFERENCE TO RELATED APPLICATIONS

The present application is related to U.S. Provisional Patent Application 60/251,655 for "NECK SAVER EYEGLASS FRAMES FOR BI-FOCALS"; Filed: Dec. 6, 2000; Inventor: John L. Bell, and U.S. Provisional Patent Application 60/328,970 for "NECK SAVER EYEGLASS FRAMES AND ATTACHMENTS FOR BIFOCALS"; Filed: Oct. 12, 2001; Inventor: John Bell.

BACKGROUND OF THE INVENTION

1. Field of the Invention

The present invention relates to frames for glasses and, more particularly, to an adjustable nose-rest mechanism and a detachable clip-on nose-rest mechanism for bi-focals that allows ready one-hand adjustment of the nose rest elevation relative to the lenses in order to vertically position the lenses (rather than tilting of the head) for ease of viewing computer screens, television screens, top shelves, and the like.

2. Description of the Background

Most wearers of bi-focals will readily appreciate the propensity for neck strain caused by prolonged use. The lenses of the bifocals are typically formed such that the wearer looks downwardly through the lenses when reading or otherwise viewing through the near vision part of the lenses, and looks straight ahead or upwardly when using the distant part of the lenses. However, very frequently the wearer may desire to use the lower or near vision section of the lens parts while looking straight ahead. This is often the case when trying to view a computer or television screen, or top shelves. To focus on the screen using the near vision part of the lenses, the wearer must tilt his/her head backward by approximately 40 degrees. When typing from a flat-lying paper document, the neck-tilting process must be repeated countless times in succession. Conversely, there is often a need to use the upper or far vision section of the lenses while looking straight ahead. For example, this may be necessary when viewing a television from a reclining position. To focus on the TV screen using the far vision part of the lenses, the wearer must tilt their head forward by approximately 40 degrees. In either of the above-described situations the net long-term result is often neck strain.

There are an abundance of prior devices that attempt to position the spectacles by raising or vertically elevating the lenses. Generally, these examples do not allow for both elevating and/or lowering the lenses through a full range. In addition, many of the prior art devices are overly complex, either structurally in the manner by which they are attached to the bi-focals, or functionally as to the manner by which they are adjusted.

For example, U.S. Pat. No. 3,365,263 to Allen shows an unwieldy inflatable nose pad for raising and lowering spectacle frames. The user carries a small hand pump.

U.S. Pat. No. 6,045,223 to Kawabata shows an extremely complicated nose pad adjustment device in which the nose pad is mounted on a bracket that adjustably slides through a yoke. The bracket may be moved to one of an upper location or lower location to adjust the vertical offset of the lenses.

U.S. Pat. No. 4,280,758 to Flader et al. shows adjustable bi-focals with a spring-biased slider element that can be moved up or down and locked into position by a latch. While the Flader et al. concept is very functional and can be adjusted simply by pressing the frame downward against the nose with one hand, the mechanism (inclusive of springs and star-wheel latch) is fairly complex and difficult to manufacture.

It would be greatly advantageous to provide an adjustable nose-rest mechanism for bi-focals that allows ready one-hand adjustment of the near-vision portion of the lens in order to vertically position the lenses (rather than tilting of the head) for ease of viewing through the lower or near vision section of the lens parts while looking straight ahead (such as when viewing above-reading-level objects like shelves, etc.), or for viewing through the far vision section of the lens (such as when viewing below reading-level objects or when viewing from a reclining position). It would further be advantageous to provide a detachable clip-on nose-rest mechanism for bi-focals that adjusts the nose rest relative to the near-vision portion of the lens.

SUMMARY OF THE INVENTION

It is, therefore, an object of the present invention to provide an adjustment mechanism for the nose-rest of bi-focals that facilitates easy one-hand adjustment of the elevation of the lenses.

It is another object to provided a simpler alternative way of vertically locating bi-focal lenses (rather than tilting the head) to alleviate neck strain when viewing computer and television screens, and top shelves in libraries and stores.

It is still another object to provide a mechanism as described above that allows adjustment along a continuous and broad range of elevations, and which securely locks the nose rest in place at any location there along.

It is still another object to provide a mechanism as described above that can clip on to any standard pair of bi-focal glasses and be easily detached from the bi-focals when not needed.

It is yet another object to provide a mechanism as described above that can be easily adjusted to fit any pair of standard bi-focals.

It is another object to provide a mechanism as described above that is rugged, stable, and yet economical to manufacture.

It is still another object to provide a mechanism as described above that has aesthetic value.

According to the present invention, the above-described and other objects are accomplished by providing an apparatus for adjusting the height of bi-focals relative to the user's eyes. The apparatus generally includes a boss secured to said bi-focals, said boss comprising a hollow sleeve aligned vertically, or individual guides attached to the brow bar and the nose bridge. An elongate slider is slidably carried in the boss or guides, and a nose rest is attached at the lower end of the slider. A set screw having an elongated head (for two-finger turning) is threaded frontally into the boss or eyeglass frame bar and is tightenable against the slider. Given the foregoing configuration, the nose rest can be adjusted along a continuous range of elevations and locked into any of said locations by tightening the set screw, thereby facilitating one-hand adjustment of the lens elevation and the detachable nose-rest mechanism can be temporarily attached to compatibly designed bi-focal glasses for viewing through the alternate location of the lens, thereby facilitating vertical positioning of the lens with simple attachment and detachment of the nose-rest assembly.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
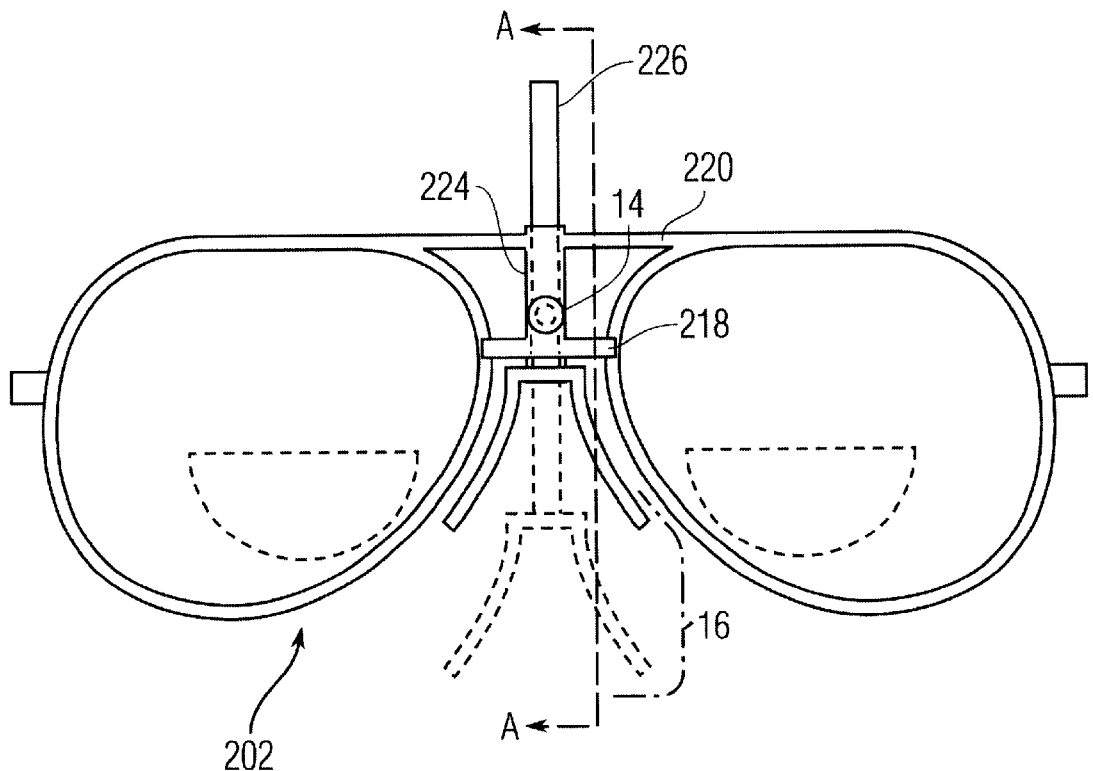
FIG. 1 is a front view of a pair of bi-focals incorporating an adjustable nose-rest mechanism with two-viewer position adjustments according to the present invention.

FIG. 1 is a front view of a pair of bi-focals incorporating one embodiment of an adjustable nose-rest mechanism 202 with two-viewer position adjustments according to the present invention. The embodiment of FIG. 1 facilitates adjustment of the near-vision portion of the lens along a range of motions from a normal elevation to a raised elevation. The particular illustrated embodiment is incorporated onto a standard wire-rimmed frame that includes an upper horizontal support 220 and lower horizontal support 218. A boss 224 (or "guide") vertically spans the two horizontal supports 220 and 218 and is attached there between. Boss 224 is formed as a hollow sleeve. Boss 224 may be machined from brass or other suitable material, and may be integrally-formed, welded or otherwise joined to the two horizontal supports 220 and 218. A slider 226 is inserted through the boss 224 and is slidably carried therein. A conventional nose rest 16 is attached to the lower end of slider 226, and the upper end of slider 226 is preferably bent at an angle to prevent over-extension from boss 224. Slider 226 allows vertical adjustment of nose rest 16, and the slider 226 and nose rest 16 may be locked into any location along the vertical extent of slider 226 by tightening a set screw 14 that is set into the boss 224. A decorative ornament or emblem may be attached to the upper end of slider 226 as desired.

Figure 2:
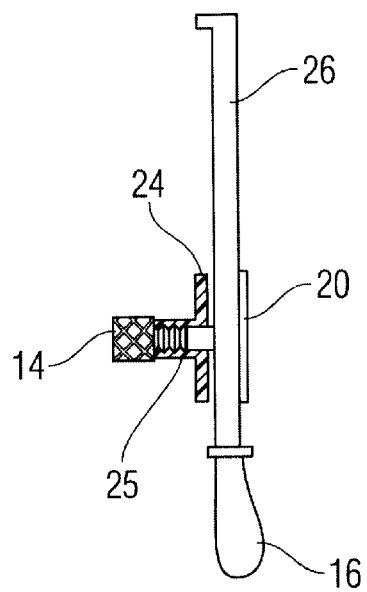
FIG. 2 is a side sectional view along line A–A' of the adjustable nose-rest mechanism of FIG. 1.

FIG. 2 is a side sectional view along line A–A' of the adjustable nose-rest 16 of FIG. 1. The boss 24 is formed with an frontal aperture defined by a collar 25 having internal screw threads. The screw threads of collar 25 are adapted to cooperate with the screw threads of set screw 14, and the length of set screw 14 is calculated such that tightening set screw 14 firmly pinches the slider 26 and locks it in position. This configuration allows adjustment of the nose rest 16 along a continuous range of elevations, and set screw 14 securely locks the nose rest 16 in place at any position along slider 26. Alternatively, a spring-mounted detent or any other form of locking detent will serve the purpose of set screw 14.

Figure 3:
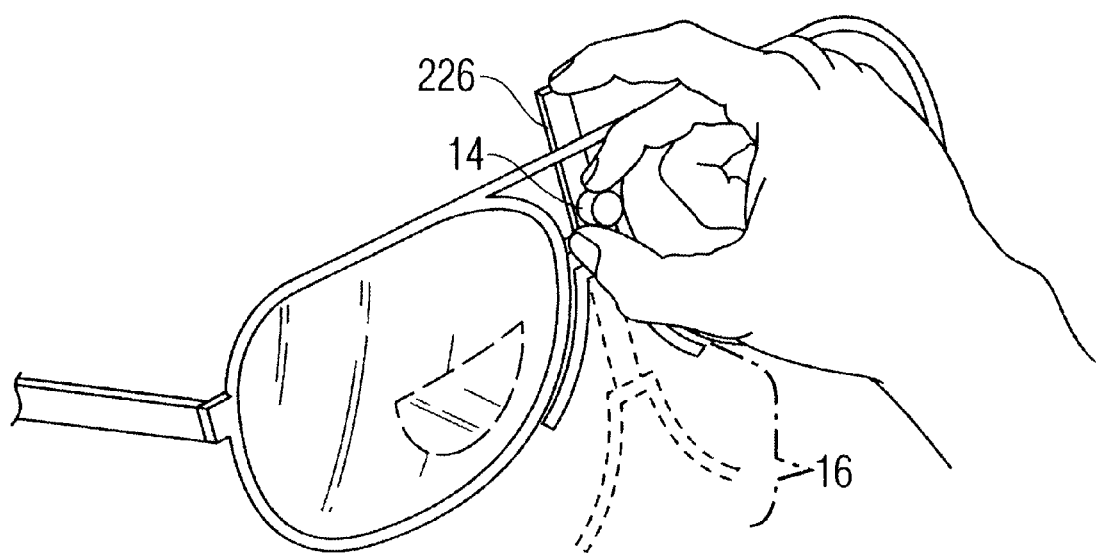
FIG. 3 is a side perspective view of the bi-focals with adjustable nose-rest mechanism as in FIG. 1 illustrating the manner and convenience of single-handed adjustment.

FIG. 3 is a side perspective view of the bi-focals with adjustable nose-rest mechanism 202 as in FIG. 1 illustrating the manner and convenience of single-handed adjustment. The user simply grips the set screw 14 between thumb and middle finger and rotates counter-clockwise to loosen, then shifts the slider 226 in the desired direction using the index finger. This way, the slider 226 can be adjusted such that the nose rest 16 is located at any desired elevation within its range. Once this is accomplished, the set screw 14 is again turned between thumb and middle finger (this time clockwise) to tighten, thereby securely locking the nose rest 16 in place at any location along slider 226.

Figure 4:
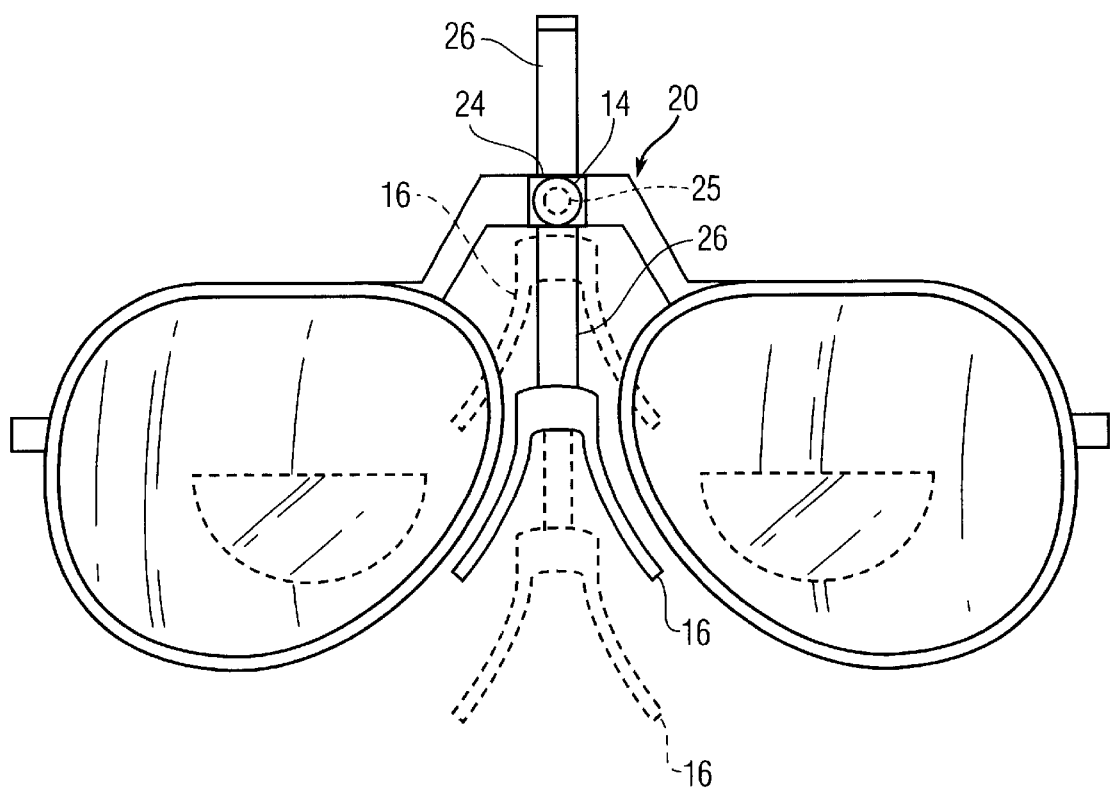
FIG. 4 is a front view of a pair of bi-focals incorporating an adjustable nose-rest mechanism with three-viewer position adjustments according to a second embodiment of the present invention.

FIG. 4 is a front view of a pair of bi-focals incorporating a second embodiment of an adjustable nose-rest mechanism 2 with three-viewer position adjustments according to the present invention. The embodiment of FIG. 4 facilitates nose-rest adjustment along a range of motions from a normal location to a lowered location as described above, and to a raised location for viewing through the near vision section of the lens such as when viewing close-up reading-level objects. The particular illustrated embodiment is incorporated onto a custom plastic or metal frame that includes a modified nose bridge 20. A boss 24 is integrally formed with the horizontal support 20 as a hollow sleeve. The boss 24 is formed with an frontal aperture having internal screw threads. The screw threads of collar 225 are adapted to cooperate with the screw threads of set screw 14. A like slider 26 is inserted through the boss 24 and is slidably carried therein. The length of set screw 14 is again calculated such that tightening set screw 14 firmly pinches the slider 26 and locks it in position. A conventional nose rest 16 is attached to the lower end of slider 26, and the upper end of slider 26 is preferably bent at an angle, or fitted with a decorative knob, to prevent over-extension from boss 24. Slider 26 allows vertical adjustment of nose rest 16, and the slider 26 and nose rest 16 may be locked into any location along the vertical extent of slider 26 by tightening the set screw 14 that is set into the boss 24. Again, a decorative ornament or emblem may be attached to the upper end of slider 26 as desired.

Figure 5:
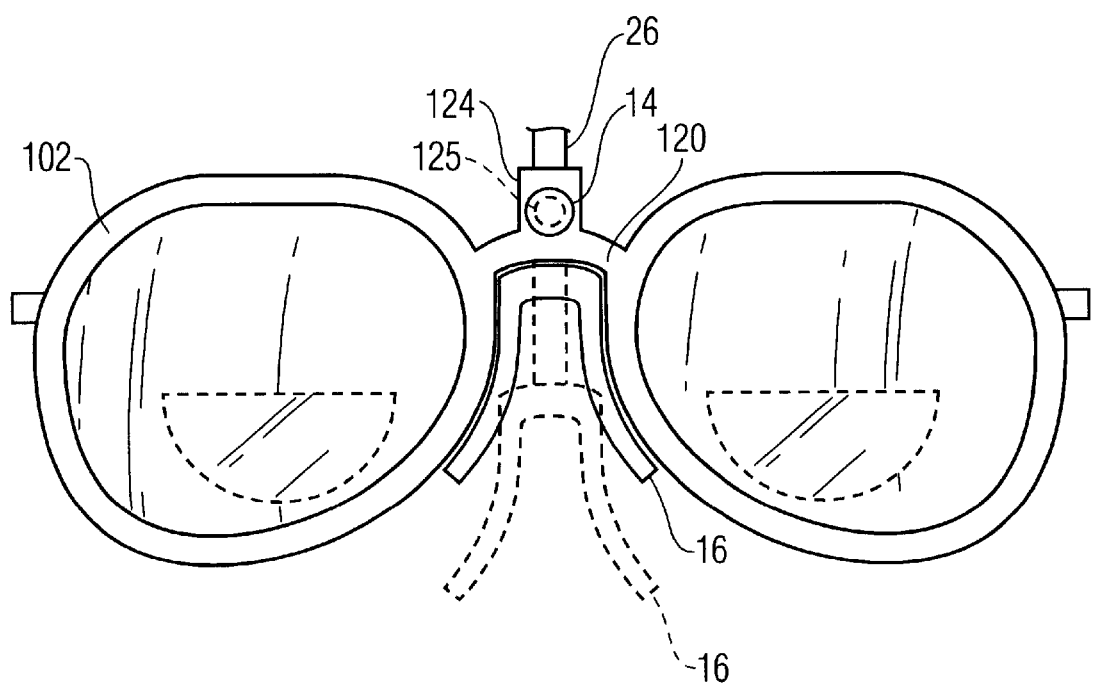
FIG. 5 is a front view of a pair of bi-focals incorporating an adjustable nose-rest mechanism similar to that of FIG. 4, except that a shallower nose bridge yields a two-viewer position adjustment.

FIG. 5 is a front view of a pair of bi-focals incorporating a third embodiment of an adjustable nose-rest mechanism 102, this time with two-viewer position adjustments. The embodiment of FIG. 5 facilitates adjustment of the near-vision portion of the lens along a range of motions from a normal location to a raised location for ease of viewing through the lower or near vision section of the lens parts while looking straight ahead. The embodiment of FIG. 5 is incorporated into a custom plastic frame that includes a specially-formed horizontal support 120, and no lower horizontal support. A boss 124 is integrally formed in the horizontal support 120, and the same slider 26 is inserted through the boss 124 and is slidably carried therein. Boss 124 may be integrally molded or otherwise formed as a hollow sleeve and a frontal aperture having internal screw threads. The screw threads of collar 125 are adapted to cooperate with the screw threads of set screw 14, and the length of set screw 14 is calculated such that tightening set screw 14 firmly pinches the slider 26 and locks it in the desired location. Nose rest 16 is attached to the lower end of slider 26 for vertical adjustment, and the slider 26 and nose rest 16 may be locked into any location along the vertical extent of slider 26 by set screw 14. Again, a decorative ornament or emblem may be attached to the upper end of slider 26 as desired.

Figure 6:
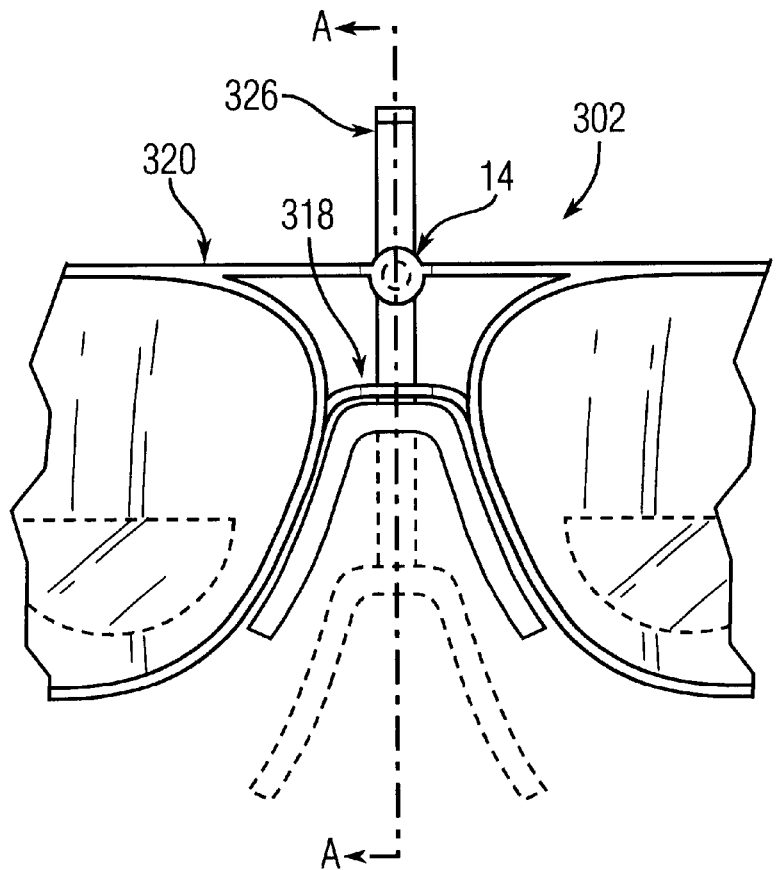
FIG. 6 is a front view of a fourth embodiment of an adjustable nose-rest mechanism, that may be attached to or detached from a customized pair of bi-focals.

FIG. 6 is a front view of a fourth embodiment of an adjustable nose-rest mechanism 302, that may be attached to or detached from a customized pair of bi-focals. The embodiment of FIG. 6 allows an ordinary double-bar eyeglass frame, with a small setscrew threaded hole in the top bar 320, unobtrusive vertical slots in both top 320 and bottom 318 bars, and a snap-on plastic nose rest, to be used as an ordinary eyeglass frame when the adjustable nose rest mechanism is detached. The adjustable nose-rest is attached to the frames by removing the snap-on nose-rest, inserting the slider 326 with attached nose-rest and securing with the setscrew 14 to control the adjustment.

Figure 7:
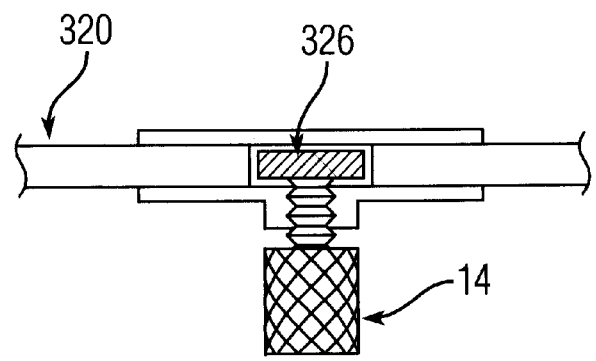
FIG. 7 is a side sectional view along line A–A' of the adjustable nose-rest mechanism of FIG. 6.

FIG. 7 is a side sectional view along line A–A' of the adjustable nose-rest mechanism of FIG. 6. As seen in FIG. 7, the setscrew 14 is inserted through the threaded hole in the top bar 320 of the eyeglass frames to adjust and secure the slider 326 in place.

Figure 8:
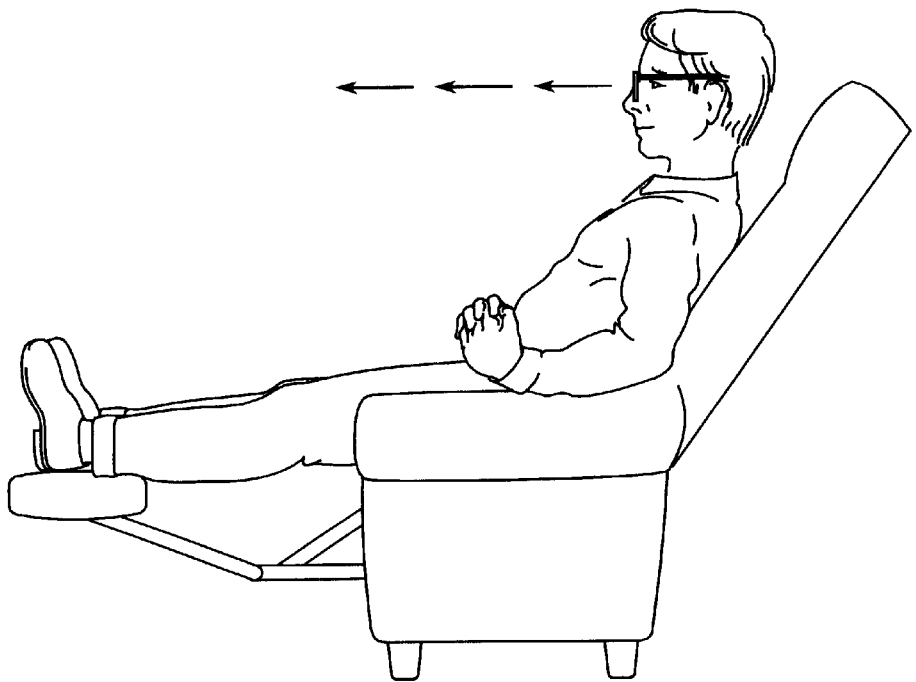
FIG. 8 illustrates the normal (strained) viewing position from a recliner using conventional bi-focals.
Figure 9:
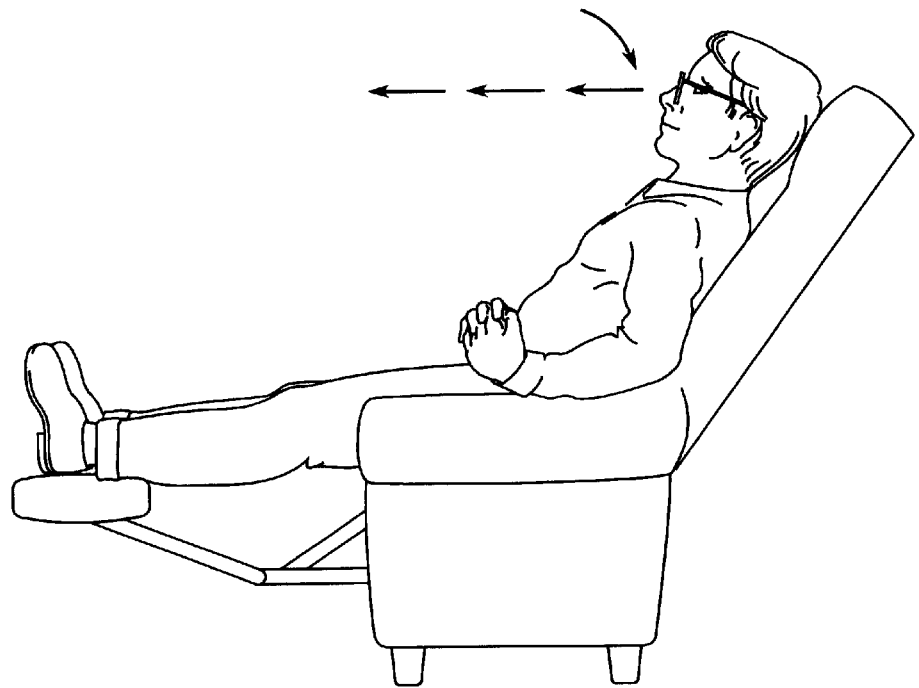
FIG. 9 illustrates the use of the embodiment of FIG. 1 to eliminate strain when viewing from a reclining position.

The adjustable nose-rest mechanism described above facilitates easy one-hand adjustment of the near-vision portion of the lens from the normal location of FIG. 8 to a lowered location as seen in FIG. 9 for ease of distance viewing through the upper or far vision section of the lens parts while looking straight ahead from a reclining viewer position. Alternatively, the adjustable nose-rest mechanism facilitates easy one-hand adjustment from the normal computer viewer position of FIG. 10 to a raised lens location as seen in FIG. 11 for ease of close-up viewing through the lower or near vision section of the lens parts while looking straight ahead. This embodiment provides a simpler and more flexible way of vertically locating the bi-focal lenses up or down rather than tilting the head. The mechanism is rugged, stable, and very economical to manufacture.

FIGS. 8–11 are perspective views illustrating the difference that can be achieved by use of the adjustable nose rest mechanism of FIG. 1.

FIG. 8 illustrates the normal (strained) viewing position from a recliner using conventional bi-focals.

FIG. 9 illustrates the use of the embodiment of FIG. 1 to eliminate strain when viewing from a reclining position. Clearly, the adjustment mechanism facilitates easy one-hand adjustment of the elevation of the lenses (rather than tilting forward of the head) to alleviate neck strain when viewing from a reclining position.

Figure 10:
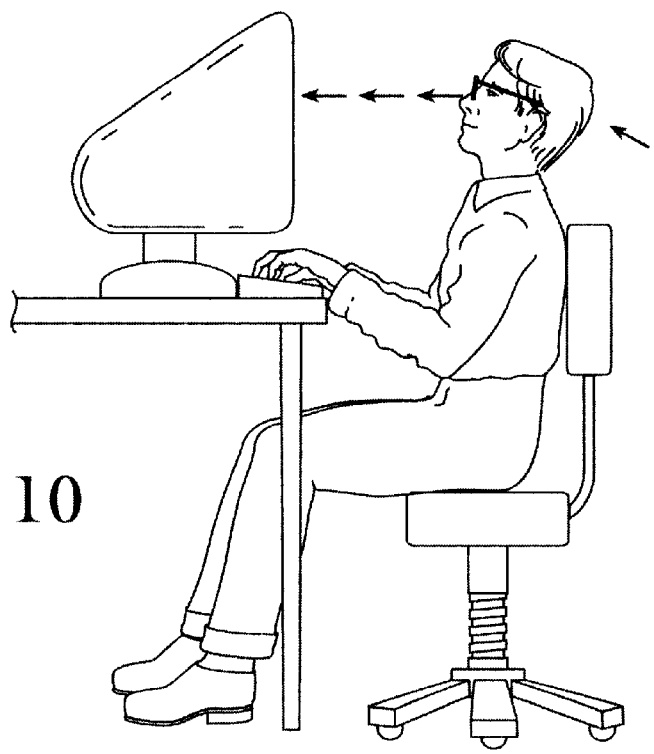
FIG. 10 illustrates the normal (strained) TV or computer viewing position.
Figure 11:
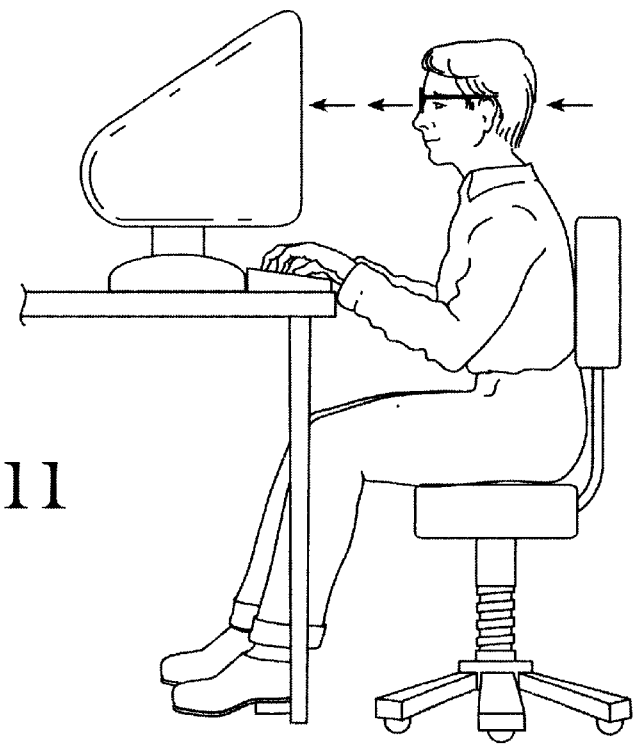
FIG. 11 illustrates the use of the embodiment of FIG. 1 to eliminate strain when viewing from a straight-on position.
Figure 12:
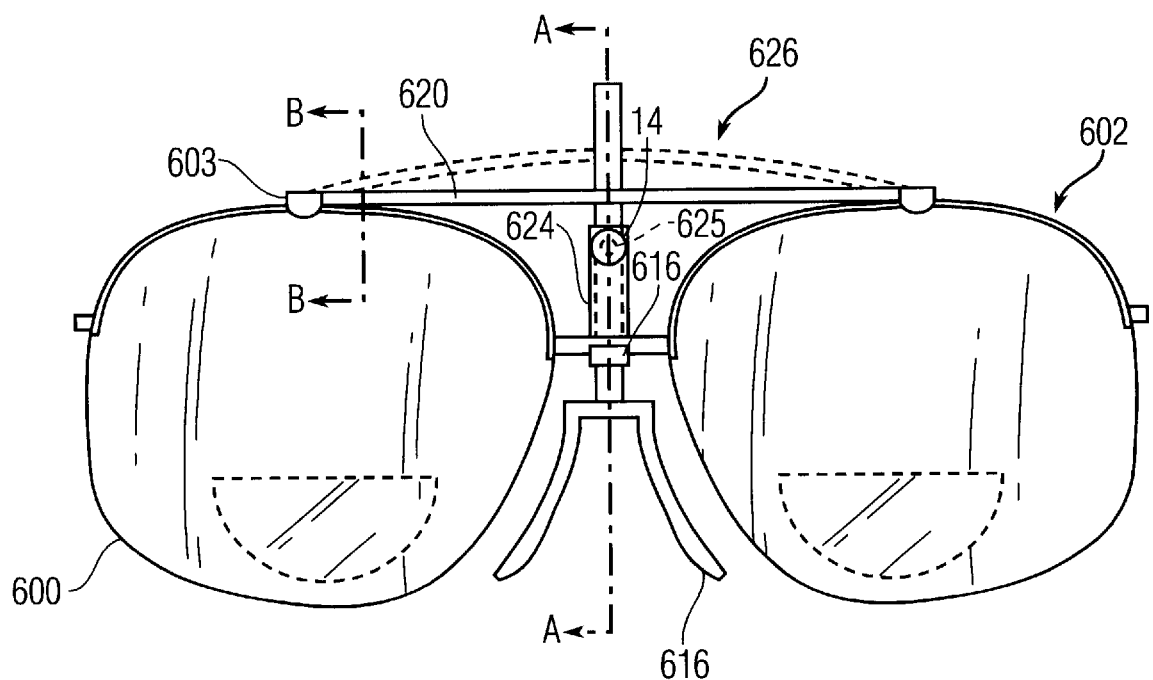
FIG. 12 is a front and exploded view of a pair of bi-focals incorporating another embodiment of a detachable clip-on nose-rest mechanism according to the present invention.
Figure 12:
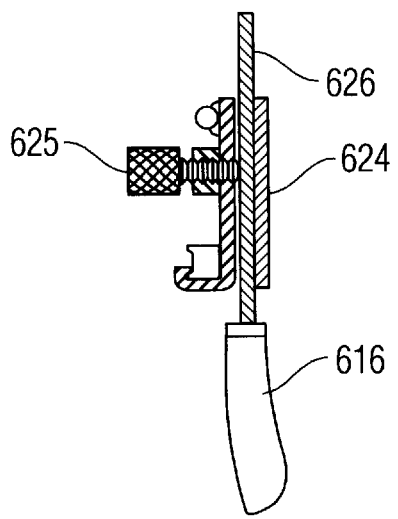
Figure 12C:
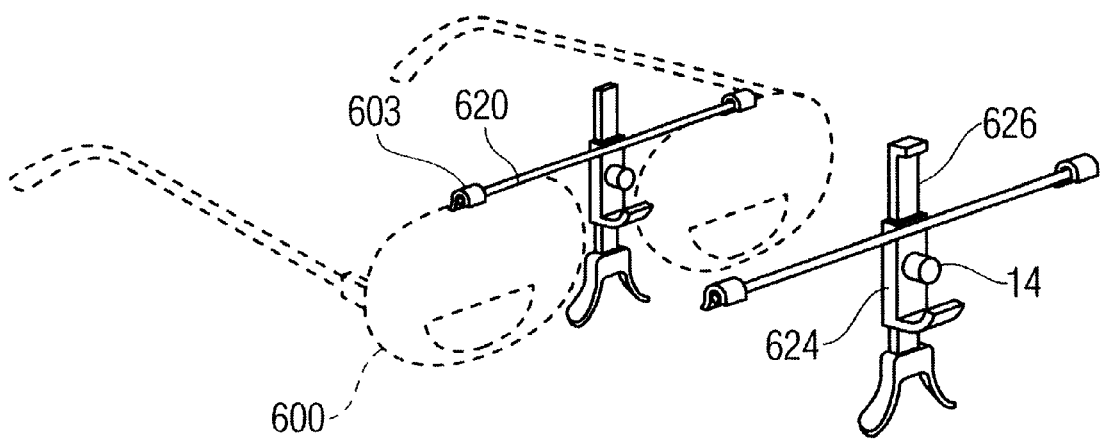
Figure 12D:
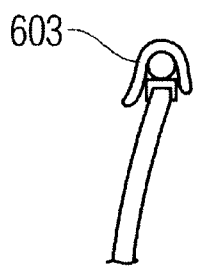

FIG. 10 illustrates the normal (strained) TV or computer viewing position.

FIG. 11 illustrates the use of the embodiment of FIG. 1 to eliminate strain when viewing from a straight-on position. Again, the adjustment mechanism facilitates easy one-hand adjustment of the elevation of the lenses (rather than tilting the head) to alleviate neck strain when viewing computer and television screens. Indeed, the device allows adjustment along a continuous and broad range of elevations. Consequently, it is equally effective in positions ranging from lying flat on the back to viewing top shelves in libraries and stores, etc.

FIGS. 12A through 12D are a front and exploded view of a pair of bi-focals incorporating another embodiment of a detachable clip-on nose-rest mechanism for single-bar bi-focals. In this embodiment, the adjustable nose-rest mechanism 602 incorporates an elongate horizontal support bar 620 of spring material mounted on a boss 624. The boss 624 supports a slider 626, and a slider locking screw 14 allows manual clamp-locking of the slider 626 in location. The horizontal spring bar 620 must be fabricated from spring steel or other like material, to provide a spring effect when the hooks on the boss are engaged, holding the boss firmly in place. Each end of the horizontal bar 620 incorporates a padded saddle 603, and as such allows the horizontal bar to rest atop the wire frame or frame-less bi-focals 600. The boss 624 is connected to the horizontal spring support 620, and a slider 626 is inserted through the boss 624 and is slidably carried therein. Boss 624 may be integrally molded or otherwise formed as a hollow sleeve and a frontal aperture having internal screw heads. The screw threads are adapted to cooperate with the screw threads of set screw 14, and the length of set screw 14 is calculated such that tightening set screw 14 firmly pinches the slider 626 and locks it in position. The bottom of the boss 624 curves outward to form a hook for attaching the adjustable nose-rest 616 to nose-bar 630 of wire frame or frame-less bi-focals 600. Nose-rest 616 is attached to lower end of slider 626 for vertical adjustment, and the slider 626 and nose rest 616 may be locked into any location along the vertical extent of slider 626 by set screw 14. The horizontal bar 620 springs up to hold boss 624 in place. This embodiment requires modification of standard eyeglass frames to suit the frame dimensions and the strength necessary to resist the applied spring loads. The adjustable nose-rest mechanism as seen in FIG. 12 and described above facilitates easy one-hand adjustment of the near-vision portion of the lens from a normal location to a raised location for ease of close-up viewing through the lower or near vision section of the lens while looking straight ahead from a reclining position. This provides a simpler and more flexible way of vertically positioning the bi-focal lenses, with the eyeglasses in place on the user's face, up or down along a continuum rather than tilting the head. Again, the mechanism is attachable, rugged, stable, and very economical to manufacture.

Figure 13:
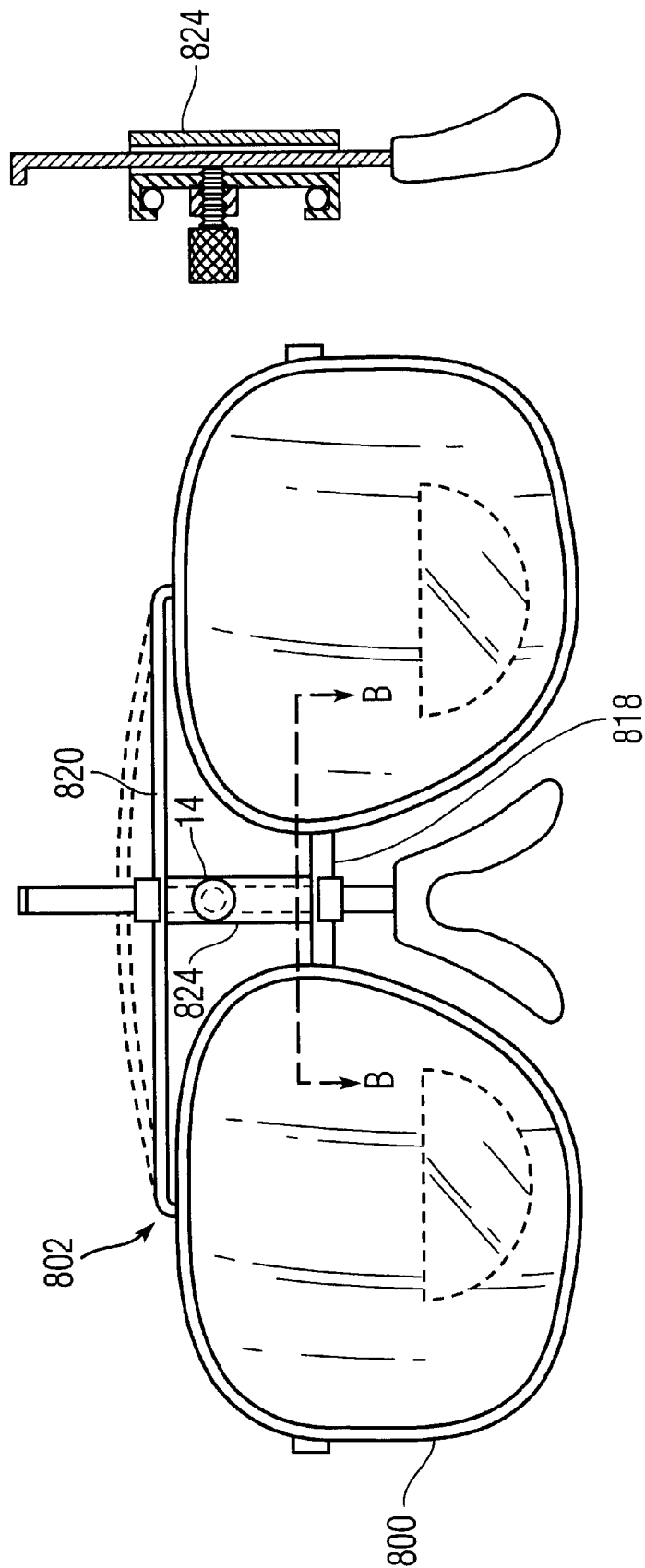
FIG. 13 is a view of a pair of bi-focals incorporating yet another embodiment of a detachable clip-on nose-rest mechanism similar to that in FIG. 12.

FIG. 13 is a view of a pair of bi-focals with yet another embodiment of a detachable clip-on nose-rest mechanism 802 for double bar bi-focals according to the present invention. The embodiment of FIG. 13 is similar to that of FIG. 12 inasmuch as it incorporates a specially formed horizontal spring bar 820. However, this particular embodiment incorporates the horizontal spring bar 820 as an integral part of the eyeglass frame 800 rather than the clip-on nose-rest attachment. The horizontal spring bar 820 must be fabricated from spring steel or other like material, to provide a spring effect when the hooks on the boss are engaged, holding the boss firmly in place. This embodiment requires a modification to standard frames to incorporate the horizontal spring bar 820. A hook on the bottom of boss 824 hooks to nose bar 818. A hook on the top of the boss 824 hooks to the horizontal spring bar 820. The nose bar 818 has detent for centering boss 824 and nose-rest 816. Operation is substantially the same as set forth in respect to FIG. 12.

Figure 14:
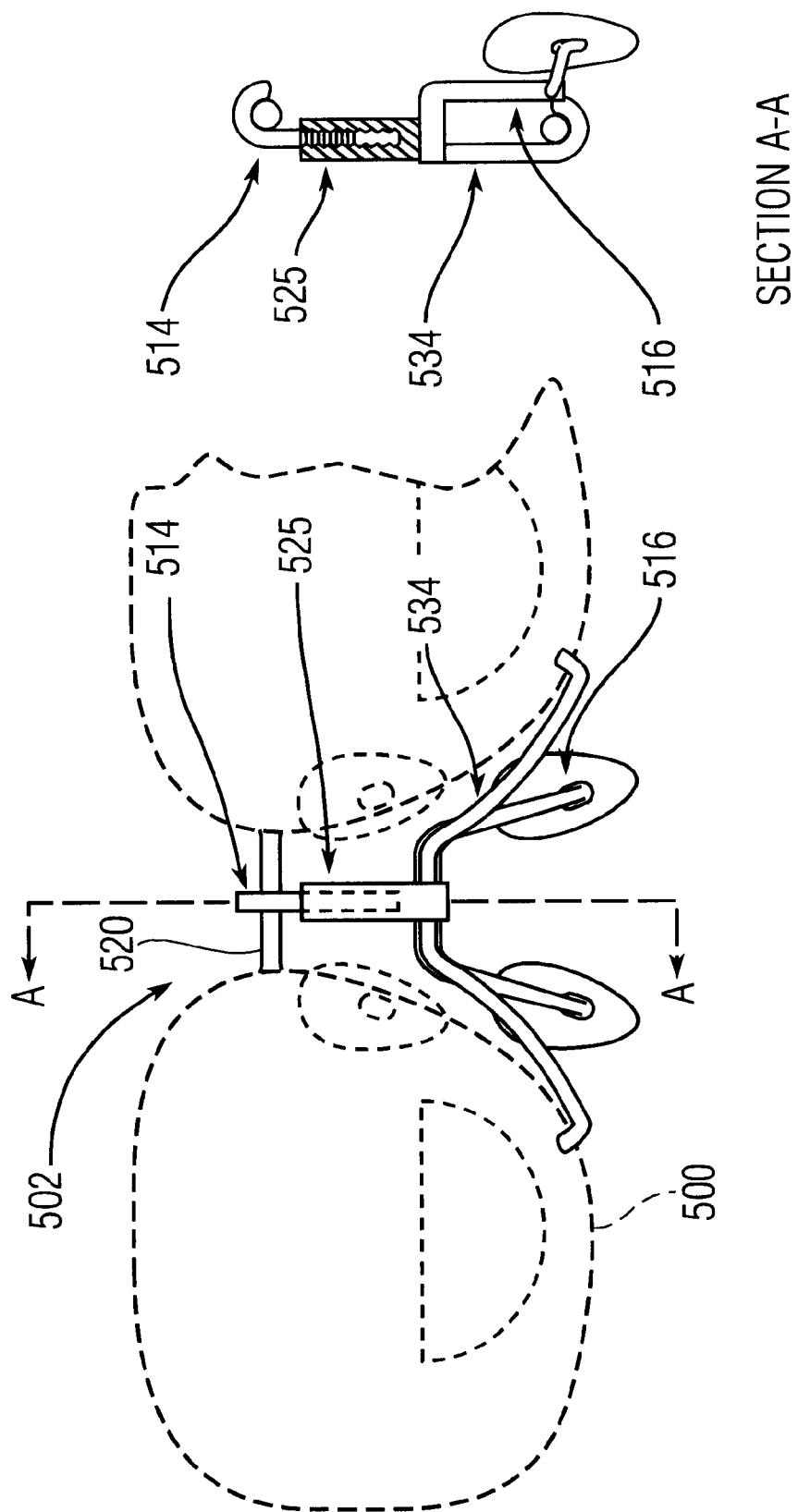
FIG. 14 is a view of a pair of bi-focals with detachable clip-on nose-rest adjustment mechanism according to another embodiment of the present invention.

FIG. 14 is an exploded view of a pair of bi-focals with detachable clip-on nose-rest adjustment mechanism 502 with single location of the nose-rest according to one embodiment of the present invention.

The embodiment of FIG. 14 facilitates adjustment of the near-vision portion (e.g., the lower portion) of the bi-focal lens from a normal location to a single raised location for ease of viewing. This relocation of the nose-rest raises the lower or near vision section of the lens and thereby allows the user to maintain a more erect head position while reading a computer screen, viewing high shelf items, or otherwise looking straight ahead. In this embodiment, an adjusting screw 514 forms a yoke that hooks over the existing upper nose bar 520 of the eyeglass frame. The screw threads of adjusting screw 514 are adapted to cooperate with the screw threads of an internally threaded tube 525, thereby facilitating adjustment to any size and shape of bi-focals. A support spring 534 is horizontally supported by the bottom portion of internally threaded tube 525. Support spring 534 is an elongate resilient member with distal catches adapted for hooking under the bottom of eyeglass frame 500. The flexibility accommodates various frame sizes. Nose pad support 516 likewise connects to the bottom of internally threaded tube and hooks to the bottom of eyeglass frame 500. Preferably, the hook-on adjusting screw 514 and hook-on support springs 534 are padded to protect the eyeglass frames from scratching.

In operation, a user simply clips the padded catches at the ends of the support spring 534 to the bottom of glass frames and the upper yoke of adjusting screw 514 over the existing upper nose bar 520 of the eyeglass frame, and then adjusts the insertion point of set screw 14 into collar 25 against the bias of support spring 534, thereby firmly affixing the detachable clip-on nose-rest adjustment mechanism in position. This configuration allows the one-time adjustment of the nose rest 516 between two set elevations. Specifically, the adjustable nose-rest mechanism as seen in FIG. 14 and described above facilitates easy adjustment of the near-vision portion of the lens from the normal location to a raised location for ease of close-up viewing through the lower or near vision section of the lens parts while looking straight ahead from a reclining position. This embodiment provides a simpler and more flexible way of vertically positioning the bi-focal lenses up or down rather than tilting the head. The mechanism is rugged, stable, and very economical to manufacture.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept.

It is to be understood, therefore, that the invention may be practiced otherwise than as specifically set forth in the appended claims.

What is claimed is:

1. Adjustable-height bifocals, comprising:
   a pair of bi-focal eyeglasses inclusive of bi-focal lenses supported in an eyeglass frame, said eyeglass frame including a bridge between said bi-focal lenses;
   a boss secured to said bridge, said boss comprising a hollow vertical sleeve;
   an elongate slider slidably inserted in said boss;
   a nose rest attached at a lower end of said slider;
   a locking detent secured to said boss and operative against said slider to lock said slider in position;
   whereby said nose rest can be adjusted along a range of elevations and locked into any position within said range by said locking detent, thereby facilitating one-hand vertical adjustment of the elevation of said lenses relative to said nose rest for ease of viewing.

2. The adjustable-height bifocals as in claim 1, whereby said locking detent further comprises a set screw threaded into said boss and tightenable against said slider.

3. The adjustable-height bifocals as in claim 2, whereby said bi-focal lenses include a lower near-vision portion and upper far-vision portion, and the elevation of said near vision portion of said lenses can be locked by said set screw into a raised position relative to a wearer's eyes for ease of middle and upper-line of sight viewing rather than tilting the head.

4. The adjustable height bi-focals as in claim 3, whereby the elevation of said far vision portion of said lenses can be locked by said set screw into a lowered position relative to the wearer's eyes for ease of middle and lower-line of sight viewing rather than tilting the head.

5. The adjustable-height bifocals as in claim 2, wherein said boss comprises a hollow vertical sleeve frontally threaded and entering said sleeve for screw-insertion of said set screw.

6. The adjustable-height bifocals as in claim 1, whereby said boss further comprises a shallow rectangular hollow sleeve, and said elongate slider comprises a strip that conforms to the interior of said boss.

7. The adjustable-height bifocals as in claim 1, whereby a boss is attached centrally on a single nose-bridge.

8. The adjustable-height bifocals as in claim 7, wherein said boss is attached on an inside of said single nose bridge.

9. The adjustable-height bifocals as in claim 7, wherein said boss is attached on an outside of said nose bridge.

10. The adjustable-height bifocals as in claim 1, wherein said bridge between said bi-focal lenses further comprises an upper bridge member and lower bridge member, and said boss is attached vertically between said upper bridge member and lower bridge member.

11. Adjustable-height bifocals, comprising:
    a pair of bi-focal eyeglasses inclusive of bi-focal lenses supported in an eyeglass frame, said eyeglass frame including a double bridge comprising a brow bar and nose bridge, said brow bar including an integral first boss defining a vertically-oriented sleeve intersected on at least one side by a threaded hole, and said nose bridge also including an integral second boss defining a vertically-oriented sleeve;
    an elongate slider slidably inserted through said first boss and second boss;
    a detachable nose rest removably attached to a lower end of said slider;
    a set screw threaded into the threaded hole of said first boss and tightenable against said slider;
    whereby said nose rest can be adjusted along a range of elevations and locked into any position within said range by tightening said set screw.

12. The adjustable height bifocals according to claim 11, wherein said nose rest can be detached from said slider, said slider removed from said first and second bosses, and said set screw removed for converting said eyeglass frame to non-adjustable.

13. A retrofit device for adding a height-adjustment feature to a conventional pair of bi-focal eyeglasses comprising bi-focal lenses supported in an eyeglass frame, said eyeglass frame including a bridge between said bi-focal lenses, the retrofit device comprising:

a boss comprising a hollow sleeve;

an elongate slider slidably inserted in said boss;

a nose rest attached at a lower end of said slider;

a locking detent secured to said boss for operative engagement with said slider to lock said slider in position;

an upwardly-turned hook formed integrally with said boss for hooking under said bridge to secure the retrofit device to said frame;

whereby said retrofit device may be attached to a conventional pair of bi-focal eyeglasses to provide for adjustment of said nose rest along a range of elevations, thereby facilitating one-hand vertical adjustment of the elevation of said lenses relative to said nose rest for ease of viewing.

14. The retrofit device according to claim 13, wherein said eyeglass frame includes a double bridge comprising a brow bar and nose bridge, said upwardly-turned hook hooking under said nose bridge, and said retrofit device further comprising a downwardly turned hook for hooking over said brow bar to secure the retrofit device to said frame.

15. The retrofit device according to claim 13, wherein said eyeglass frame includes a double bridge comprising a brow bar and nose bridge, and said retrofit device further comprises a bar of resilient material attached cross-wise to said boss and forming spring arms for biasing said upwardly-turned hook into engagement with said boss.

16. A retrofit device for adding a height-adjustment feature to a conventional pair of bi-focal eyeglasses comprising bi-focal lenses supported in an eyeglass frame, said eyeglass frame including a bridge between said bi-focal lenses, the retrofit device comprising:

an internally-threaded telescoping member having a downwardly turned hook at an upper end for hooking over said bridge to secure the retrofit device to said frame; and a nose rest attached at a lower end of said telescoping member;

whereby said retrofit device may be attached to a conventional pair of bi-focal eyeglasses to provide for adjustment of said nose rest along a range of elevations, thereby facilitating one-hand vertical adjustment of the elevation of said lenses relative to said nose rest for ease of viewing.

17. The retrofit device according to claim 16, further comprising an upwardly-turned hook formed integrally at a lower end of said telescoping member for hooking under said bridge to secure the retrofit device to said frame.

18. The retrofit device according to claim 16, wherein said eyeglass frame includes a double bridge comprising a brow bar and nose bridge, said downwardly turned hook hooking over the brow bar, and said retrofit device further comprising a bar of resilient material attached cross-wise to said telescoping member at a lower end thereof and forming spring arms for biasing said downwardly-turned hook into engagement with said brow bar.

19. The retrofit device according to claim 18, wherein said spring arms are formed with saddles at the distal ends for hooking under the eyeglass frame below the opposing lenses.

* * * * *